Patented Mar. 20, 1945

2,371,610

UNITED STATES PATENT OFFICE 2,371,610

REACTIVATION OF CATALYSTS

James P. Daugherty, Jr., Swarthmore, Pa., assignor to Houdry Process Corporation, Wilmington, Del., a corporation of Delaware No Drawing. Application December 3, 1940,
Serial No. 368,337

5 Claims. (Cl. 252—242)

This invention has to do with catalytic reactions and especially with periodic reactivation of the catalytic material. More particularly it concerns reactions conducted at relatively low temperatures and under liquid phase conditions.

When reactions are conducted at temperatures of the order of 400° F. and below, it is desirable to effect reactivation operations at temperatures at or near those of on-stream operation in order to minimize time lost in heating up and then cooling down the catalyst as is necessary in the conventional regeneration by oxidation or burning of contaminating deposits at temperatures above 900° F. and often above 1000° F., as up to about 1200° F. At such high temperatures there is also danger of permanent impairment of the activity of catalysts.

Among the objects of the invention are to conduct the cycle of catalytic operations at such low temperatures that the activity of catalysts is not impaired, to devise improved methods for periodically restoring the activity of catalysts so as to maintain consistently high yields of desired products during on-stream operations, and in general to simplify and to improve regenerating procedure.

For low temperature reactions, especially with reactants in the liquid phase, catalysts of very high activity as a rule give the best yields. High activity which is highly selective in character can be obtained in catalysts which are pure or substantially free of impurities. Such catalysts are attainable wholly or in part from sols, gels or gel-like materials when the original ingredients as well f s the steps of manufacture are carefully controlled so as to exclude or to remove undesirable components.

When such catalysts are used to promote low temperature reactions in liquid phase the catalyst surfaces are constantly flushed with liquid. However, substances are encountered or formed by the reaction which are so strongly adsorbed or otherwise held by the catalyst that they are not displaced or dissolved by the liquid charge or reaction products. Such substances are probably of the nature of viscous liquids which reduce the action of the catalyst by closing its pores or covering its active surfaces. It has been found that the catalyst can be freed of these substances to a great extent by interrupting the on-stream feed and sending through the catalyst chamber while still at low temperature a suitable ejecting agent for which the catalyst has greater affinity than for the substances retained by it. Care must be taken to keep the temperature low during the ejecting step and to send the ejecting agent promptly in order that the substances be ejected before they are converted into solid or semi-solid form and consequently become more difficult to remove. After the catalyst has been thoroughly flushed by the ejecting agent it is only necessary to free the catalyst of such agent. This is effected by raising the temperature of the catalyst and blowing with a suitable gaseous drying agent. The catalyst is then cooled down to on-stream temperature whereupon the on-stream reactants are readmitted to the catalyst.

Enough purging fluid must be used in the first step to effect substantially complete removal of vaporizable or distillable substances retained by the catalyst. The ejecting agent is preferably water in atomized, gaseous or partly gaseous state, but other fluids of a similar nature, such as ammonia or dilute acids may be utilized. The rate of admission of the purging fluid should be sufficiently high to produce mass displacement of liquids and by preference in the interests of obtaining reasonably short regenerating periods is sufficiently high to effect substantially complete displacement within a period of 30 minutes, as for example within 10 or 15 minutes. When steam is utilized as the displacing agent amounts varying from 10 to 15 pounds per 1,000 liters of catalyst per minute effect satisfactory purging of the catalyst in a period of about 10 minutes. It is important that the purging fluid remain in contact with the catalyst at all times between the end of the on-stream period and the drying step.

In order to minimize as much as possible any change in the activity of the catalyst it is important to raise the catalyst temperature to a level sufficiently high during the drying step to effect complete or substantially complete removal of the purging medium. For highly adsorptive catalysts prepared, for example, by coprecipitation methods, where the catalytic components are presented in a high state of purity as in synthetic silica-alumina compounds, a drying temperature above 500° F., for example 600° F., must be reached if this result is to be attained. The catalyst is blown with any suitable gaseous drying agent, such as nitrogen, $CO_2$, fumes of combustion (especially after purification), air, etc. During drying the temperature of the catalytic material is not permitted to exceed 700° F., drying in most instances taking place in the range of 600° to 700° F., as at about 650° F.

Temperature adjustment may be effected during either or both the purging or drying steps. The desired drying temperature may be reached before the end or at the end of the purging period, or it may not be reached until after the selected drying medium has been admitted to the purged catalyst. Reduction in temperature to on-stream level may be effected in the latter portions of the drying step. It is advantageous, however, to effect substantially complete removal of purgable substances at temperatures as low as possible.

When the above-described reactivating procedure is followed, a catalyst can be used for many on-stream reaction periods with but slight change in the activity of the catalyst, depending, of course, upon the extent to which the reactants are free or freed of known catalyst poisons. Although it is preferred to utilize charging stocks which are substantially free of catalyst poisons, such as sulphur and sulphur compounds, in order to obtain a maximum number of consecutive on-stream operations, the invention is not limited to reactivation of catalysts which do not contain such poisons. In fact, in many instances where used catalysts appear to have their activity substantially impaired by ineffective or improper treatment, it is possible by successive reactivations of the type herein described to bring the catalysts back to at least an approximation of their original activity.

While heat exchange equipment of known forms including heat exchange members imbedded in the catalytic material may be utilized, such equipment is not essential to the practice of the present invention nor is it necessary that the catalysts be in the form of fragments or molded pieces, as is usually requisite for high temperature regenerations effected by actual combustion of contaminating deposits. The catalyst may be of any size or shape, powdered, granular, fragmentary or otherwise, provided it can be kept in place during the purging and drying steps of the reactivation treatment. Even when air is used as the drying medium at temperatures of 600° to 650° F., there is but little burning and only a slight rise in temperature, as of the order of 15° to 20° F., during the entire drying step, provided effective purging of the catalytic mass has been performed at temperatures below 400° F. Accordingly, since changes in catalyst temperature can be effected entirely by the heat supplied or removed by the purging and drying fluids, the present invention permits catalysts to be used in large masses and in very simple and inexpensive catalytic equipment.

Suitable catalysts comprise plural oxide gels, one of whose components is not reducible, such as silica, beryllia, alumina, zirconia. The other component or components may also be non-reducible or may include such reducible oxides as thoria, titanium, and manganese for example. A good catalyst is a coprecipitated substantially pure silica-alumina gel in which silica predominates, as in the range of ratios by weight of about 4:1 to about 10:1, specifically, for example in the ratio of about 7:1.

*Example*

In the catalytic polymerization of gaseous olefinic hydrocarbons of the $C_3$ and $C_4$ carbon atom groups, the reactant charge was sent under sufficient pressure to maintain it in liquid phase and at a temperature of about 280° F. into a catalytic converter containing synthetic silica-alumina catalyst of a high degree of purity and of high activity produced by coprecipitation from sodium silicate and sodium aluminate and treated to reduce the sodium content to less than 0.5% and to give a weight ratio of silica to alumina of about 5:1. The operation was conducted so that the catalyst temperature was maintained in the range of about 300° to 320° F. After a period on-stream of approximately 2 hours, during which the conversion of olefins to liquid polymers gradually fell off from 85% to about 75%, reactivation was effected by stopping the hydrocarbon charge and sending steam as the purging medium at substantial on-stream temperature for about 10 minutes at the rate of about 10 pounds of steam per minute per 1,000 liters of catalyst. This insured the removal of polymers at approximately on-stream temperature. The catalyst was then heated to about 650° F. by sending superheated steam through the catalyst chamber. Air heated to about 650° F. was then substituted for the steam sent through the catalyst chamber at the rate of about .2 cubic feet per minute per liter of catalyst for approximately 15 minutes first in one direction and then in the opposite direction. During the first few minutes the catalyst temperature rose to about 670° F. The temperature of the charged air was gradually reduced so as to cool the catalyst to about 300° F., at which time the case was submitted to vacuum to remove air from the catalyst and then the hydrocarbon reactants were again charged thereto for another on-stream period. Repeating the on-stream and reactivation steps showed no appreciable deviation in yield of liquid polymers during more than thirty runs.

Less steam can be used for the purging step, as for example 3 pounds per minute per 1,000 liters of catalyst, if a vacuum approximating 28 inches of mercury is maintained on the catalyst chamber, but a longer period is required, as for example 60 minutes instead of 10 minutes.

For commercial installations providing two catalytic cases designed for continuous operation with one case on stream while the other is in reactivation, a good operation with refinery cracked gases low in sulphur is given by a 12 hour cycle (six hours on-stream and six hours in reactivation) which under most conditions provides ample time for conducting the reactivation in an economical manner. However, it is entirely feasible to remain on stream for shorter periods, as in the above example (particularly when the catalytic chambers have efficient heat exchange equipment), or for much longer periods as up to 36 hours, especially with recirculation. For the drying step the catalyst may be heated up in any desired or convenient manner while the drying medium is passed therethrough, provided however that the catalyst has been thoroughly purged at low temperature. When air is used as the drying medium it seems to make no difference how much air is used. After one or a series of reactivations the catalyst appears to contain about the same amount of residual extraneous material or deposit—carbonaceous in character—normally less than 1% and usually even below 0.5% by weight, but this deposit has little if any adverse effect upon the activity of the catalyst.

I claim as my invention:

1. In the reactivation of highly active synthetic catalysts after use in promoting chemical reactions at low temperature of the order of 400° F. and below and in liquid phase, the process steps of purging the catalyst with an ejecting agent which effects mass displacement of both reactants and products while the catalyst is still at low temperature, then blowing the catalyst with a gaseous drying medium while raising the temperature of the catalyst sufficiently to effect removal of the ejecting agent, namely above 500° F. but not above 700° F., cooling the catalyst to reaction temperature for another reaction period while excluding moisture therefrom, and extracting the drying medium from the catalyst as the final step in presenting it in dry and highly active condition for the resumption of the on-stream operation.

2. In the reactivation of highly active synthetic catalysts after use in promoting chemical reactions at low temperature of the order of 400° F. and below and in liquid phase, the process steps of purging the catalyst while still at low temperature followed by drying the catalyst at somewhat higher temperature but not above 700° F., utilizing as the purging agent a fluid for which the catalyst has greater affinity than for the reactants and reaction products, displacing such fluid at said higher temperature by blowing the catalyst with a gaseous drying medium, utilizing the drying medium first to raise the temperature of the catalyst above 500° F. but not above 700° F. and then to lower the temperature of the catalyst to reaction temperature after the drying step has been completed, and freeing the catalyst of the drying medium while maintaining it in dry condition before resuming on-stream operation.

3. In the reactivation of high activity synthetic catalysts utilized to promote useful reactions at temperatures below 400° F. the process steps of freeing the catalyst of contaminating material at the end of an on-stream operation by an ejecting agent for which the catalyst has greater affinity than for the reactant charge and for the products of the on-stream operation, then blowing the catalyst with a gaseous drying medium, utilizing the drying medium to first raise the temperature of the catalyst above 600° F. but not above 700° F. and then to cool the catalyst down to on-stream temperature, and extracting the drying medium from the catalyst as the final step in presenting it in dry and highly active condition for the resumption of the on-stream operation.

4. In the reactivation of high activity catalysts utilized for catalysis of hydrocarbons at temperatures below 400° F. in recurring cycles of on-stream and regenerating operations the process steps at the end of an on-stream operation of raising the temperature of the catalyst to at least 400° F. while sending a purging medium therethrough to eject hydrocarbons therefrom, then sending an oxidizing medium through the catalyst while maintaining the latter in the temperature range of 600 to 700° F. to effect drying of the catalyst, cooling the catalyst to on-stream temperature, and freeing the catalyst of oxidizing medium while maintaining it in dry condition before resuming on-stream operation.

5. In the reactivation of high activity catalysts capable of being freed of moisture at about 650° F. and utilized to promote catalysis of hydrocarbons at temperature below 400° F. the process steps of subjecting the catalyst to superheated steam to free it of hydrocarbons and to raise its temperature to about 400° F., then blowing the catalyst with air heated to about 650° F. to dry the same, removing heat from the catalyst during the blowing step so that the temperature of the catalyst does not rise above 700° F., cooling the dried catalyst down to on-stream temperature while excluding moisture therefrom, and freeing the catalyst of air as a final step in presenting a completely dried and reactivated catalyst for further on-stream operation.

JAMES P. DAUGHERTY, Jr.